Patented Nov. 4, 1952

2,616,856

UNITED STATES PATENT OFFICE 2,616,856

DETERGENT COMPOSITION

Myer Rosenfeld, Aberdeen, and Charles F. Pickett, Bel Air, Md.

No Drawing. Application December 23, 1948, Serial No. 67,083

9 Claims. (Cl. 252—118)

(Granted under the act of March 3, 1883, as amended April 30, 1928; 370 O. G. 757)

The invention described in the specification and claims may be manufactured and used by or for the Government for governmental purposes without the payment to us of any royalty thereon.

This invention relates to a new composition of matter consisting of the condensation product of diethylene triamine and diacetone alcohol, and to detergent compositions including it.

We have discovered that the condensation product of diethylene triamine and diacetone alcohol has utility in enhancing the detergent properties of the oleate of diethylene triamine. In the removal of grease, oil, tar, asphalt and the like adhering to metal surfaces, such as on automobile bodies, automobile engines, automobile chassis and ordnance material, e. g., combat tanks, trucks, cannon and rifles, with high flash naphtha, mixtures of high flash naptha and kerosene, and mixtures of high flash naphtha, kerosene and a tertiary alcohol, for example, tertiary butyl alcohol or diacetone alcohol, the oleate of diethylene triamine may be included in the above named cleaning solvents as a detergent. However, when the oleate of diethylene triamine is so used, relatively large proportions of it are required, so that its use in this relationship is uneconomical.

However, we have found that when condensation products prepared according to the present invention are mixed with the oleate of diethylene triamine, such mixtures dissolved in the above named solvents will give better detergent properties than the same, or even larger proportions of the oleate of diethylene triamine used alone as the detergent agent.

The condensation product referred to above may be prepared by mixing diethylene triamine with diacetone alcohol in the proportions of one mol of diethylene triamine with one, two or more mols of diacetone alcohol. When the diethylene triamine and diacetone alcohol are mixed in the above proportions at ambient temperature, the reaction mixture quickly becomes warm. The reaction appears to be a very rapid one, and for the purposes of the present invention can be considered as complete after the mixture has been allowed to stand for at least one hour. If, however, the initial mixture of the reagents is heated to about 70° C., the reaction between the diethylene triamine and the diacetone alcohol proceeds with evolution of large quantities of heat, so that in this event the reaction goes to completion much faster than when the reagents are mixed at ambient temperature. In view of the violence of the reaction, when heating is employed the precaution should be taken of adding the diethylene triamine dropwise to the diacetone alcohol in a flask provided with a reflux condenser.

As an illustrative example of a procedure for preparing the condensation product referred to above, the following is given: to 499 ml. (about 4 mols.) of diacetone alcohol are added 216 ml. (about 2 mols.) of diethylene triamine at ambient temperature in about 25 ml. portions, shaking after each addition. The last four portions of diethylene triamine are added slowly to avoid a too vigorous reaction. Reaction mixtures, similarly prepared, have given the results described above with the oleate of diethylene triamine after standing respectively one hour, several days, and four weeks, thus indicating that the active ingredient synergistically cooperating with the oleate of diethylene triamine is at least formed to a considerable extent in the early stages of the reaction. The condensation product obtained is a liquid of a density of approximately 0.95 gram per ml. at 22.7° C. The condensation reaction appears to involve the splitting off of water by the union of the carbonyl oxygen of the diacetone alcohol with hydrogens of one or both of the terminal amine groups of the diethylene triamine.

The oleate of diethylene triamine, used in formulating the detergent compositions according to the present invention, may be prepared as follows: to 439 ml. of high flash naphtha are added 330 ml. of oleic acid, whereupon 108 ml. of diethylene triamine are gradually added over a period of a few minutes, and the whole thoroughly mixed. This results in a solution of the oleate of diethylene triamine in high flash naphtha of a concentration of about 0.46 gm. of oleate of diethylene triamine per one milliliter of solution at 22.7° C. The solution at this temperature has a density of 0.903 gram per ml. Instead of high flash naphtha, there may be used equal volumes of kerosene or mixtures of kerosene and high flash naphtha or any suitable solvent of the oleate of diethylene triamine.

Detergent compositions according to the present invention are prepared by mixing the diethylene triamine oleate, prepared, for example, as described above with the condensation product of diethylene triamine and diacetone alcohol. These compositions may be prepared either by directly mixing the oleate of diethylene triamine and the condensation product, or by mixing them in the presence of the metal cleaning solvents: high flash naphtha, mixtures of high flash naphtha and kerosene, and mixtures of high flash naphtha, kerosene and a tertiary alcohol such as tertiary butyl alcohol or diacetone alcohol. By way of examples the following are given:

*Example I*

0.23 gm. of the oleate of diethylene triamine and 0.24 gm. of the condensation product are intimately mixed with 100 ml. of high flash naphtha, or with 100 ml. of a mixture of 70 parts by volume of high flash naphtha and 30 parts by volume of kerosene, or with 100 ml. of a mixture of 66.5 parts by volume of high flash naptha, 28.5 parts by volume of kerosene and 5 parts by volume of diacetone alcohol or tertiary butyl alcohol. Here the oleate represents about 48.8% by weight of the dissolved material.

*Example II*

This example is the same as Example I except that 0.35 gram of the diethylene triamine oleate and 0.24 gram of the condensation product are used with 100 ml. of the cleaning solvents of Example I. Here the oleate represents about 59.4% by weight of the dissolved material.

*Example III*

This example is the same as Example I except that 1.38 gms. of the oleate of diethylene triamine and 3.33 grams of the condensation product are used with 100 ml. of the cleaning solvents of Example I. Here the oleate represents about 29.3% by weight of the dissolved material.

*Example IV*

Into 100 ml. of the cleaning solvents of Example I there are mixed: (a) 0.71 gm. of diethylene triamine oleate and 1.43 grams of the condensation product, the oleate representing about 33.1% by weight of the dissolved material, or (b) 2.11 grams of diethylene triamine oleate and 2.37 grams of the condensation product, the oleate here representing about 47% by weight of the dissolved material.

The solutions prepared according to Examples I to IV inclusive are suitable for use as cleaning composition without any further additions or treatment.

The efficacy of the combined action of the oleate of diethylene triamine and the condensation product described herein appears to be a function of the ratio by weight of the oleate of diethylene triamine to the condensation product and of the concentration of these reagents in the cleaning solvents. The simple test of using a prepared solution in the cleaning of metal soiled by grease, oil, tar, asphalt or mixtures of these will reveal whether the cleaning reagents have been used in such proportions as to give the extent or efficacy of cleaning desired.

Instead of preparing the condensation product above described, and the oleate of diethylene triamine as separate reagents and then adding them to the cleaning solvents, the separate reagents used in preparing the said oleate and condensation product, may be added to the cleaning solvents. It has been observed that the condensation product and the oleate of diethylene triamine form from the reagents in the cleaning solvent but more slowly than when they are prepared separately.

High flash naphtha referred to herein has the following physical properties: specific gravity, about 0.870 to about 0.890; boiling point range, from about 300° F. to about 400° F.; flash point, a minimum of about 100° F. Its aromatic hydrocarbon content may vary from about 85% to 100%.

We claim:

1. A detergent composition consisting essentially of a mixture of the oleate of diethylene triamine and the condensation product of diethylene triamine and diacetone alcohol in the ratio of about one mole of the diethylene triamine to between about one and two moles of the diacetone alcohol, the diethylene triamine oleate comprising between about 29% and about 60% by weight of said composition.

2. A composition of matter consisting essentially of a solution of the composition of claim 1 in an organic solvent chosen from the group consisting of high flash naphtha and mixtures thereof with kerosene.

3. The composition of claim 2 in which the mixtures of high flash naphtha and kerosene contain additionally a small amount of a tertiary alcohol of the group consisting of tertiary butyl alcohol and diacetone alcohol.

4. A composition of matter consisting essentially of a mixture of diethylene triamine oleate and the condensation product of diethylene triamine and diacetone alcohol in the ratio of about one mole of the diethylene triamine to between about one and about two moles of the diacetone alcohol, the diethylene triamine oleate comprising 50% by weight of said mixture, said mixture dissolved in high flash naphtha to the extent of about 5 grams per liter of the naphtha.

5. A detergent composition consisting essentially of a mixture of the oleate of diethylene triamine and the condensation product of diethylene triamine and diacetone alcohol in the ratio of about one mole of the diethylene triamine to at least one mole of the diacetone alcohol, the diethylene triamine oleate comprising between about 29% and about 60% by weight of said composition.

6. A detergent composition consisting essentially of a mixture of the oleate of diethylene triamine and the condensation product of diethylene triamine and diacetone alcohol in the ratio of about one mole of diethylene triamine to at least one mole of diacetone alcohol, the oleate comprising between about 29% and about 60% by weight of said composition.

7. A composition of matter consisting essentially of a solution of the composition of claim 6 in an organic solvent chosen from the group consisting of high flash naphtha and mixtures thereof with kerosene.

8. The composition of claim 7 in which the mixtures of high flash naphtha and kerosene contain additionally a small amount of a tertiary alcohol of the group consisting of tertiary butyl alcohol and diacetone alcohol.

9. A solution in high flash naphtha of a composition of matter consisting essentially of a mixture of about 50% by weight of diethylene triamine oleate and about 50% by weight of the condensation product of diethylene triamine and diacetone alcohol in the ratio of about one mole of diethylene triamine to at least one mole of diacetone alcohol, said composition dissolved in the naphtha to the extent of about five grams per liter.

MYER ROSENFELD.
CHARLES F. PICKETT.

REFERENCES CITED

The following references are of record in the file of this patent:

UNITED STATES PATENTS

| Number | Name | Date |
|---|---|---|
| 1,833,899 | Hoyt | Dec. 1, 1931 |
| 2,095,814 | Hopff et al. | Oct. 12, 1937 |
| 2,251,988 | Curran | Aug. 12, 1941 |
| 2,374,113 | Lowe | Apr. 17, 1945 |
| 2,400,876 | Daskars et al. | May 28, 1946 |
| 2,509,197 | Borus et al. | May 30, 1950 |